(12) United States Patent
Shingle

(10) Patent No.: US 7,118,371 B2
(45) Date of Patent: Oct. 10, 2006

(54) APPARATUS FOR INTRODUCING PLASTIC MATERIAL INTO AN ANNULAR MOLD CAVITY

(75) Inventor: John M. Shingle, Perrysburg, OH (US)

(73) Assignee: Owens-Illinois Closure Inc., Toledo, OH (US)

( * ) Notice: Subject to any disclaimer, the term of this patent is extended or adjusted under 35 U.S.C. 154(b) by 334 days.

(21) Appl. No.: 10/634,530

(22) Filed: Aug. 5, 2003

(65) Prior Publication Data
US 2005/0031730 A1 Feb. 10, 2005

(51) Int. Cl.
B29C 45/23 (2006.01)

(52) U.S. Cl. .................. 425/546; 425/564; 425/812

(58) Field of Classification Search ............. 425/562, 425/563, 564, 565, 566, 130, 577
See application file for complete search history.

(56) References Cited

U.S. PATENT DOCUMENTS

| | | | |
|---|---|---|---|
| 4,512,730 A * | 4/1985 | Kudert et al. | 425/130 |
| 4,942,010 A | 7/1990 | Baker | |
| 5,238,378 A * | 8/1993 | Gellert | 425/130 |
| 6,179,604 B1 | 1/2001 | Takeda | |
| 6,402,503 B1 | 6/2002 | Hickman | |

FOREIGN PATENT DOCUMENTS

| | | |
|---|---|---|
| DE | 29609356 U1 | 7/1996 |
| DE | 10039864 A1 | 2/2002 |
| EP | 0385175 A | 9/1990 |
| EP | 0714747 A2 | 6/1996 |
| JP | 10016005 | 1/1998 |
| JP | 11170310 | 6/1999 |
| JP | 11170308 | 9/1999 |
| WO | WO 91/18727 | 12/1991 |

* cited by examiner

Primary Examiner—Tim Heitbrink

(57) ABSTRACT

An injection molding apparatus (10, 110) for molding an annular thermoplastic element, such as an annular closure element (E) with no more than a single weldline in the annular extent of the thermoplastic element. The thermoplastic element is molded in an annular mold cavity (12, 112), and moldable thermoplastic material (M) is introduced into the mold cavity from a coaxially-aligned annular flow path (18, 118) that is defined between a sliding sleeve (24, 124) and an annular member (22, 122). The sliding sleeve surrounds and is slideable with respect to a fixed pin (26, 126) and is slideable between a first, or forward, position, where no thermoplastic material can flow into the mold cavity, and a second, or rearward, position, where thermoplastic material can flow into the mold cavity. Thermoplastic material is introduced into the annular flow path, at a location upstream of the second position of the sliding sleeve, in a single stream through a passage (28, 128) to limit the weldlines in the molded thermoplastic element to no more than one.

2 Claims, 4 Drawing Sheets

APPARATUS FOR INTRODUCING PLASTIC MATERIAL INTO AN ANNULAR MOLD CAVITY

FIELD OF THE INVENTION

This invention relates to a method of and an apparatus for injection molding a product from a thermoplastic material. More particularly, this invention relates to a method and an apparatus of the foregoing character for injection molding an annular product from a thermoplastic material with a minimum of weld or fusion lines within the molded product.

BACKGROUND OF THE INVENTION

Many thermoplastic products, including closures for bottles and jars, are produced from a thermoplastic material at a moldable temperature by injection molding, a process that is generally described in commonly-assigned U.S. Pat. No. 6,402,503 B1 (Hickman), the disclosure of which is incorporated by reference herein. A problem exists in manufacturing annular thermoplastic products by injection molding, however, in that known types of injection molding apparatus for annular products, for example, apparatus of the type described in U.S. Pat. No. 6,179,604 B1 (Takeda), tend to introduce moldable thermoplastic material under pressure into a flow path that leads to the injection mold in multiple streams around the circumference of the flow path. This leads to a characteristic known as weld lines where thermoplastic material from separate streams tends to weld or fuse together, and such weld lines tend to be locations of weakness in the molded products as a result of stress concentrations at the weld lines; they also tend to lead to dimensional distortion of the molded product as a result of uneven stress and shrinkage within the thermoplastic material from different streams in the molded product. Certain disadvantages of weld lines in a molded tubular product are described in U.S. Pat. No. 4,942,010 (Baker), and these disadvantages also apply to injection molded annular thermoplastic closure elements, such as the closure element 12 of the dispensing closure of my co-pending U.S. patent application Ser. No. 10/058,445, and probably also to injection molded annular gears, such as the gear 1 of the aforesaid U.S. Pat. No. 6,179,604 B1.

SUMMARY OF THE INVENTION

In an injection molding method and apparatus according to the present invention, heated, moldable thermoplastic material is injected under pressure into a mold that defines, with a core pin therein, an annular cavity. The thermoplastic material is injected in an annular stream along a flow path that is aligned with the core pin of the injection mold, and the annular stream is defined, on its inside, by a reciprocating annular pin that surrounds and reciprocates with respect to a fixed pin that seats against an end of the core pin. Intermittent flow of the heated thermoplastic material into the injection mold is obtained by reciprocating the reciprocating sleeve that surrounds the fixed pin between an innermost position, where it blocks flow of thermoplastic material into the mold, and an outermost position, where it permits thermoplastic material to flow into the mold in an annulus that surrounds a free end of the reciprocating sleeve. Thermoplastic material at a suitable temperature and pressure is introduced in a single stream into an annulus that surrounds the reciprocating sleeve along a flow path that extends at an acute angle with respect to the longitudinal central axis of the core pin and at a location that is upstream of the outer end of the core pin. Thus, such thermoplastic material will form an annulus with no more than a single weld or fusion line therein, and this will be at a location upstream of the location of the injection mold where separate portions of the thermoplastic material on opposed sides of the weld line can readily fuse to one another with a minimum of stress concentrations at the weld line.

Accordingly, it is an object of the present invention to provide an improved injection molding method and apparatus for molding articles from a heated thermoplastic material.

More particularly, it is an object of the present invention to provide an injection molding method and apparatus of the foregoing character for molding annular thermoplastic articles that have a central opening extending through each such article.

Even more particularly, it is an object of the present invention to provide an injection molding method and apparatus for molding annular thermoplastic articles that have no more than one weld line in each such article.

For a further understanding of the present invention and the objects thereof, attention is directed to the drawing and the following brief description thereof, to the detailed description of the invention and to the appended claims.

Other objects and advantages of the present invention will become apparent to those skilled in the art upon a review of the following detailed description of the preferred embodiment and the accompanying drawings.

DETAILED DESCRIPTION OF THE INVENTION

Figure 1:
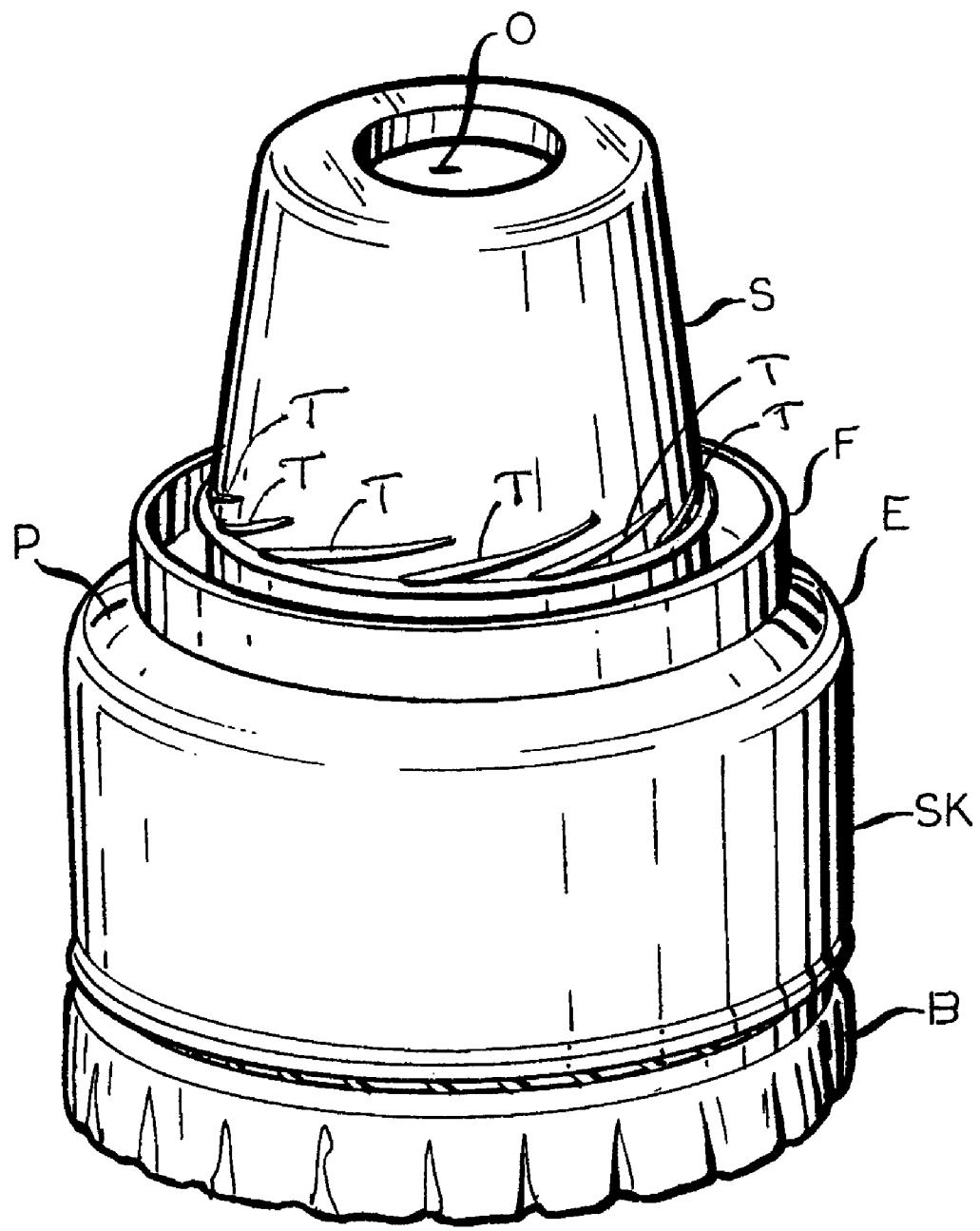
FIG. 1 is a perspective view of an article, specifically, an element of a closure assembly, that can advantageously be formed from a thermoplastic material by an injection molding method and apparatus according to the present invention.

FIG. 1 illustrates an element E of a closure assembly that can advantageously be produced integrally in a single piece from a suitable thermoplastic material by an injection molding method and apparatus according to the present invention. The element E corresponds to the closure element 12 of the 2-piece dispensing closure 10 of the aforesaid application Ser. No. 10/058,445. The element E has an annular top panel P with an annular spout S of generally frusto-conical shape that extends from a central portion of the top panel P in a first direction, the spout S having a central opening O at an outermost end thereof. The element E also has annular skirt SK that extends from an exterior of the top panel P in a second direction that is opposed to the first direction. Because of the central opening O, the thermoplastic material that is used to form the element E must be introduced into an injection molding apparatus that is used to mold the element E in an annular pattern, parallel to a longitudinal central axis of the element E, rather than in a cylindrical pattern along the longitudinal central axis as in the case of the apparatus of the aforesaid U.S. Pat. No. 6,402,503 B1, which is used to injection mold an article A that has a closed end.

The closure element E, when designed for the packaging of a comestible product, also has a disengagable, tamper-indicating band B formed integrally with the skirt SK at a lowermost margin of the skirt SK, it has an annular flange F that surrounds and is spaced from the spout S to retain a disengageable tamper-indicating band on a dust cover (not shown) that is to be applied to the closure element E to surround and close the spout S, and it has helically extending thread projections T that project outwardly from the spout S and serve to permit the dust cover to be removeably secured to the spout S of the closure element E.

Figure 2:
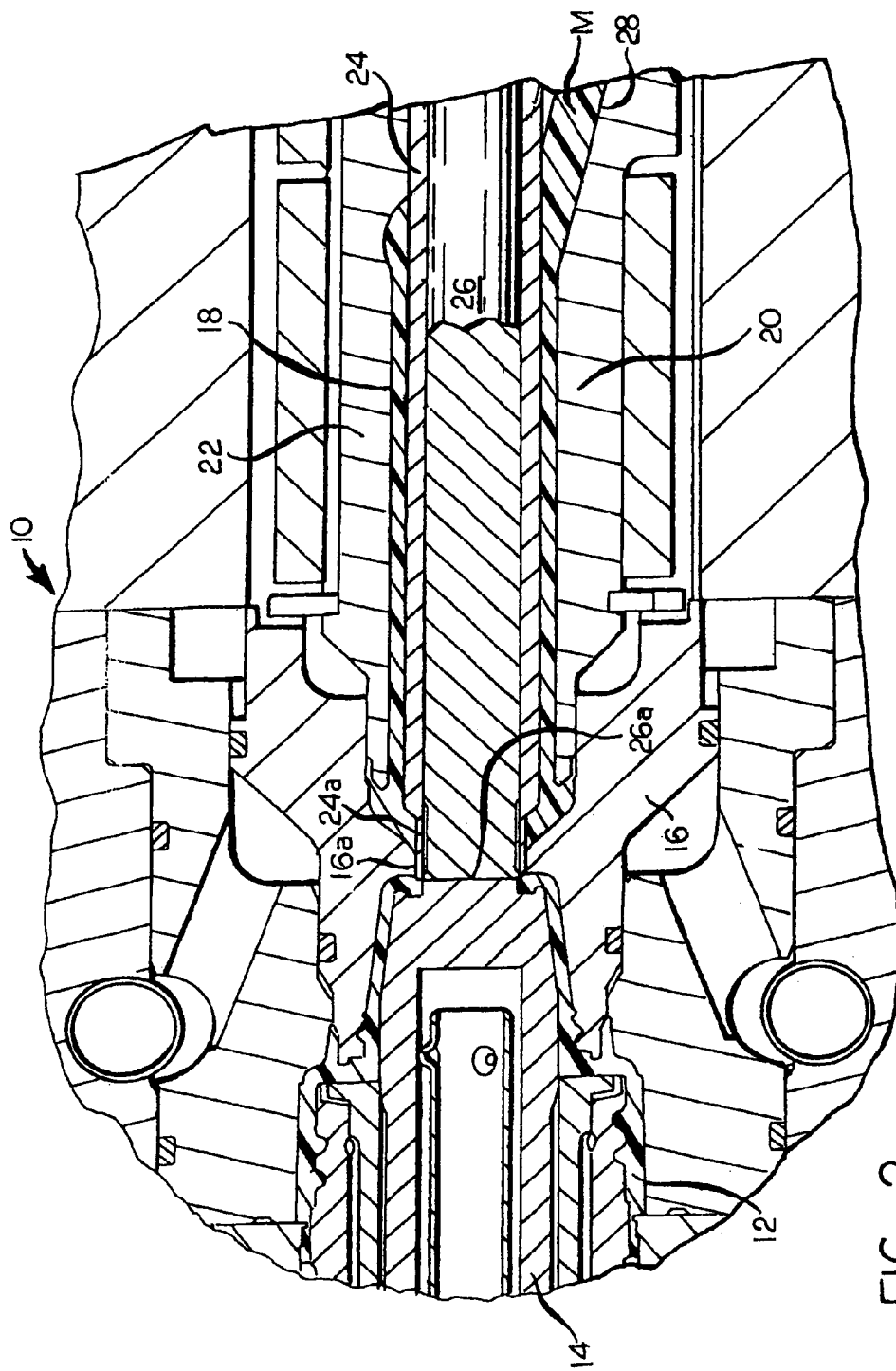
FIG. 2 is a fragmentary view, in cross-section, of a portion of an injection molding apparatus according to an embodiment of the present invention.

Injection molding apparatus according to FIG. 2 is generally indicated by reference numeral 10 and is used to injection mold an annular article with an opening therein, such as the closure element E of FIG. 1, in a mold cavity 12 that conforms to the shape of the article to be molded therein. The mold cavity 12 is defined, on its interior, by a core pin assembly 14, which is hollow to permit a coolant to be circulated therethrough, when and if desired. An annular mold 16 that partly surrounds a free end of the core pin assembly 14 defines the exterior of the cavity 12.

A suitable thermoplastic material, for example, a material comprised mainly of polypropylene or low or high density polyethylene, is injected into the cavity 12 through an annular injection nozzle 20 at a suitable pressure and temperature. Specifically, FIG. 2 shows a condition after the material M has been injected into the cavity 12 through an annulus 18 that is defined by a non-reciprocating annular member 22 and a reciprocating sleeve 24 that surrounds and reciprocates with respect to a fixed pin 26—i.e., fixed with respect to nozzle 20. The fixed pin 26 is coaxially aligned with the core pin assembly 14, and a free end 26a of the fixed pin 26 abuts against a free end of the core pin assembly 14 to define an opening in the article being molded in the cavity 12, for example, the opening 0 in the closure element E.

In the condition of the injection molding apparatus 10 that is shown in FIG. 2, the sleeve 24 is in an advanced position relative to the core pin assembly 14, to prevent further material M from flowing into the cavity 12. When the sleeve 24 is retracted, however, as will be hereinafter described in greater detail, and after the removal of an element E from the cavity 12, material M will again flow into cavity 12 and in an annular pattern through an annulus that is defined by the cavity 12, the free end 26a of the fixed pin 26 and a bore 16a of the annular mold 16. In that regard, a free end 24a of the sleeve 24 is shown as being of a reduced radial thickness relative to the portion of the sleeve 24 that is behind the free end 24a to provide a properly-sized annular orifice for proper flow of the material into the cavity 12.

The entirety of the material M that flows into the annulus 18 flows through a passage 28 in the injection nozzle 20. The passage 28 extends at an acute angle with respect to a longitudinal central axis of the injection nozzle 20 to avoid the need for sharp changes in direction of the material M as it enters the annulus 18. The introduction of the entirety of the material M that flows through the cavity 12 through a single passage 28 reduces the number of weld lines within the material M in the annular passage 18, as the material M flows into a circumferentially endless pattern surrounding the sleeve 24, to no more than a single weld line.

Figure 3:
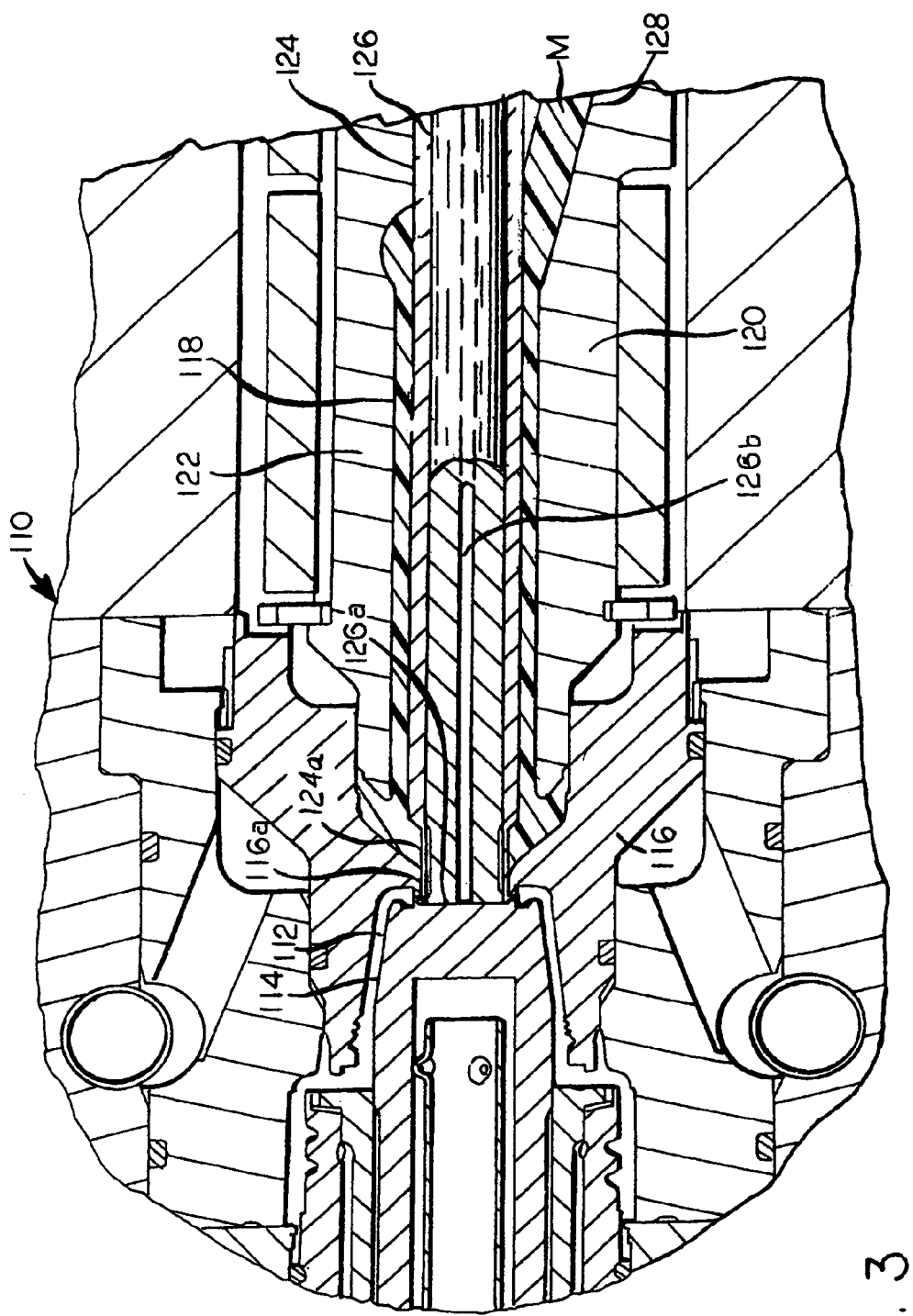
FIG. 3 is a view like FIG. 2 of an alternate embodiment of an injection molding apparatus according to the present invention.

Modified injection molding apparatus is illustrated in FIG. 3 where elements that correspond to elements of FIG. 2, exactly or substantially, are identified by 100 series reference numerals, the last 2 digits of which are the same as the 2-digit numerals of the corresponding element of the embodiment of FIG. 2. Thus, in FIG. 3, there is shown injection molding apparatus that is generally identified by reference numeral 110. The apparatus 110 is shown in a condition as it is about to be used to injection mold an annular article with an opening therein, such as a modified version of the closure element E of FIG. 1, in a mold cavity 112 that conforms to the shape of the article to be molded therein. The article to be molded in the cavity 112 differs from the closure element E that is molded in the mold cavity 12 of the embodiment of FIG. 2 in that the inside diameter of the opening O is provided a sealing rib that corresponds to the sealing rib 38 of the aforesaid co-pending application Ser. No. 10/058,445.

The cavity 112 is defined, on its interior, by a core pin assembly 114, which is hollow to permit a coolant to be circulated therethrough, when and if desired, and on its exterior, by an annular mold 116 that partly surrounds a free end of the core pin assembly 114 and defines the cavity 112 with the core pin assembly 114.

A suitable thermoplastic material M, for example, a material comprised mainly of polypropylene or low or high density polyethylene, is injected into the cavity 112 through an annular injection nozzle 120 at a suitable pressure and temperature. Material M is injected into the cavity 112 through an annulus 118 that is defined by a non-reciprocating annular member 122 and a reciprocating sleeve 124 that surrounds and reciprocates with respect to a fixed pin 126. The fixed pin 126 of the embodiment of FIG. 3 differs from the fixed pin 26 of the embodiment of FIG. 2 in that the fixed pin 126 is provided with a central bore 126b to permit air within the mold cavity in the space into which material M is being injected to form sealing fins, as heretofore explained, to be evacuated. In any case, the fixed pin 126 is coaxially aligned with the core pin assembly 114, and a free end 126a abuts against the free end of the core pin assembly 114 to define an opening in the article being molded in the mold cavity 112, for example, an opening corresponding to the opening of the closure element E.

In the condition of the injection molding apparatus 110 that is shown in FIG. 3, the sleeve 124 is in an advanced position relative to the core pin assembly 114, to prevent material M from flowing into the cavity 112. When the sleeve 124 is retracted, however, as will be hereinafter described in greater detail, the material M will flow into the cavity 112 in an annular pattern through an annulus that is defined by the free end 126a of the fixed pin 126 and a free end 124a of the sleeve 124. In that regard, the free end 124a of the sleeve 124 is shown as being of a reduced radial thickness relative to the portion of the sleeve 124 that is behind the free end 124a to provide a properly sized annular orifice for proper flow of the material M into the mold cavity 112.

The entirety of the material M that flows into the annulus 118 flow through a passage 128 in the injection nozzle 120 at an acute angle with respect to a longitudinal central axis upon the injection nozzle 120 to avoid the need for sharp changes in direction of the material M as it enters the passage 118. The introduction of the entirety of the material M that flows to the cavity 112 through a single passage 128 reduces the number of weld lines within the material M in the passage 118, as the material M flows into a circumferentially endless pattern surrounding the sleeve 124, to no more than a single weld line.

Figure 4:
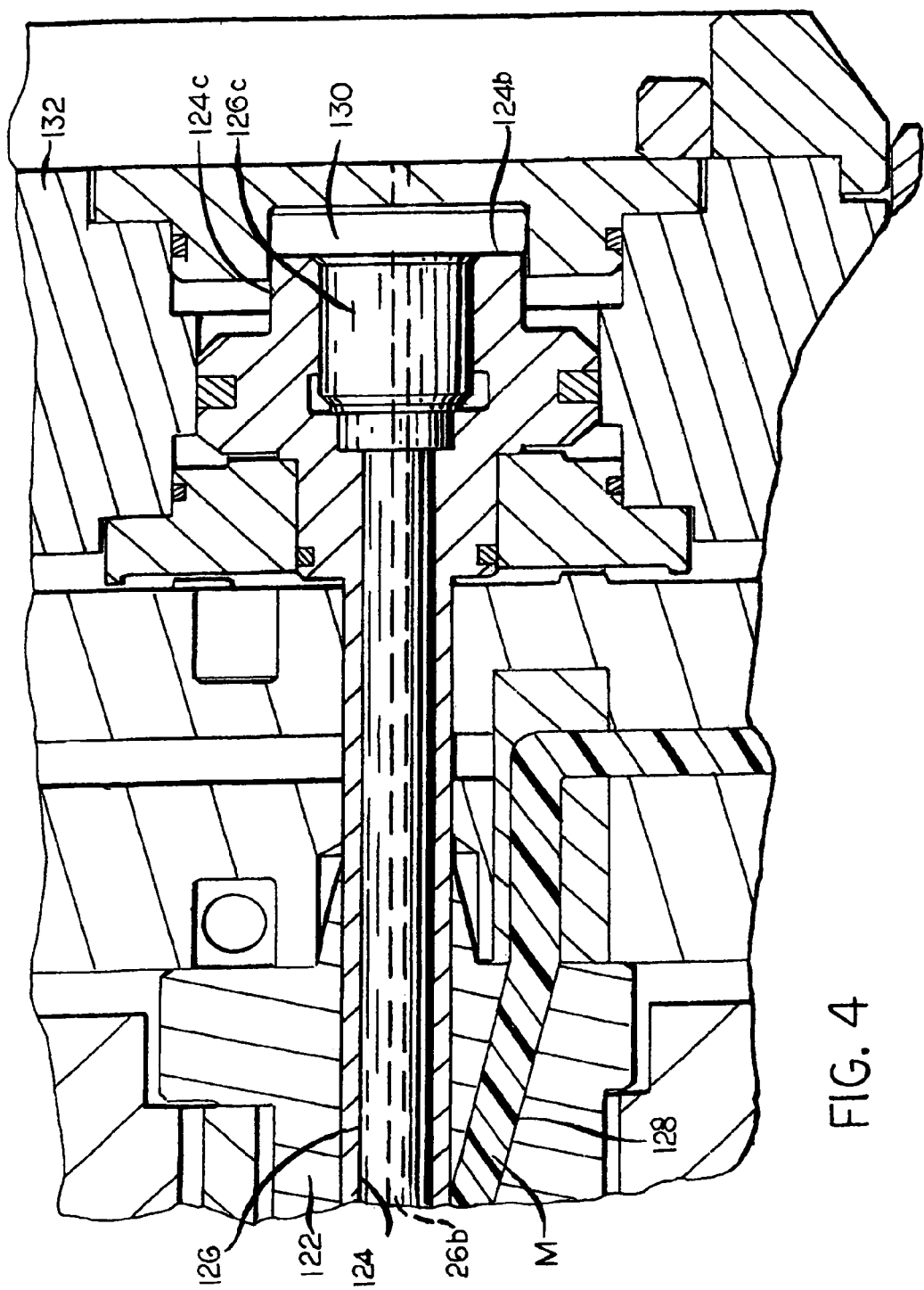
FIG. 4 is a fragmentary view, in cross-section, of another portion of the injection molding apparatus of FIG. 3.

FIG. 4 illustrates the opposed end of the injection molding apparatus shown in FIG. 3, it being understood that the opposed end of the apparatus shown in FIG. 2 is of a similar construction, but for the omission of a bore that corresponds to the bore 126*b* that extends through the fixed pin 126. The fixed pin 126 has an enlarged free end 126*c*, and the free end 126*c* is surrounded by an enlarged free end 124*c* of the sliding sleeve 124. The free end 124*c* of the sliding sleeve 124 is slidably positioned in a recess 130 of a fixed machine frame 132, and the sliding sleeve 124 is caused to move rectilinearly in opposed directions by a force applied against an end surface 124*b* of the free end 124*c* of the sleeve 124 by means, not shown, such as a fluid cylinder.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

I claim:

1. Apparatus for introducing a moldable thermoplastic material into an annular mold cavity to mold an annular thermoplastic part that has no more than a single weld line therein, said apparatus comprising:

an annular mold cavity having an annular opening thereinto;

a fixed pin axially aligned with the opening of the mold cavity and being immovable during molding relative to the opening of the mold cavity;

a passage extending through said fixed pin for venting air from said mold cavity;

an annular sleeve surrounding the fixed pin and being moveable with respect to the fixed pin between a first position that is adjacent to the mold cavity and a second position that is away from the mold cavity to define, with the fixed pin when in the second position, an annular path for introducing moldable thermoplastic material into the annular opening of the mold cavity; and means for introducing moldable thermoplastic material into the annular path, at a location upstream of the second position of the annular sleeve, in no more than a single path.

2. Apparatus according to claim 1 wherein:

said means for introducing comprises a passage that extends at an acute angle with respect to a longitudinal central axis of said annulus mold cavity.

* * * * *